May 2, 1961  C. J. PIPER  2,982,036
VEHICLE ACTUATED GATE
Filed Nov. 17, 1958  2 Sheets-Sheet 1
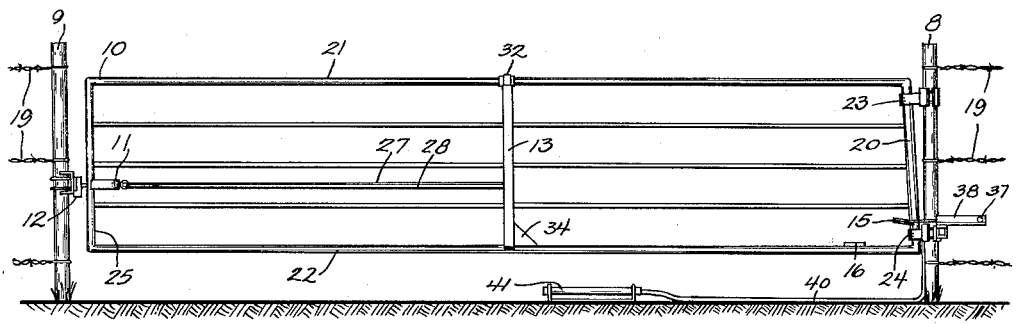
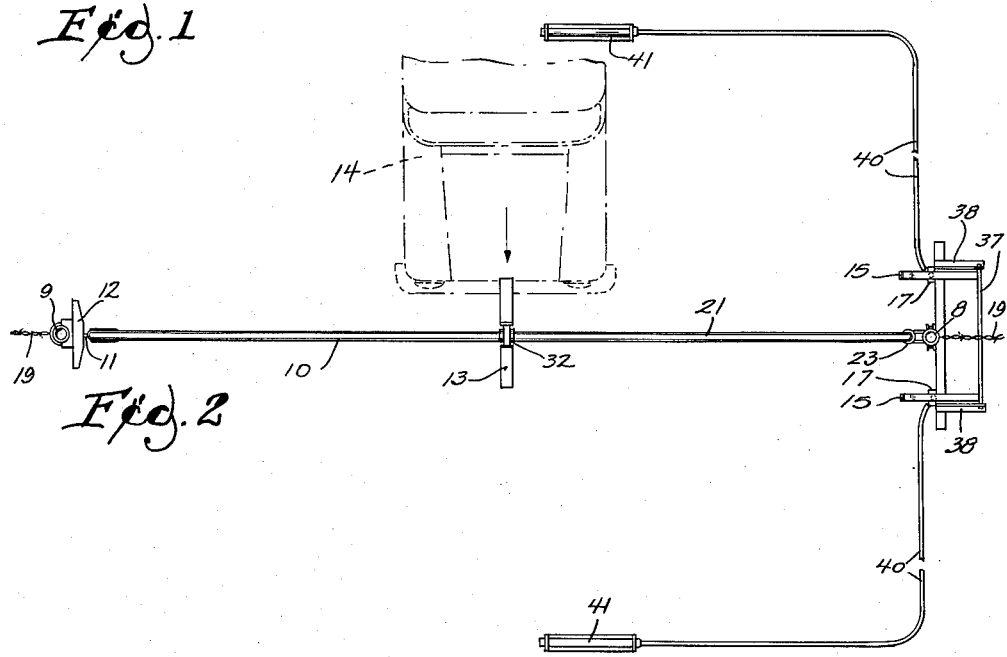
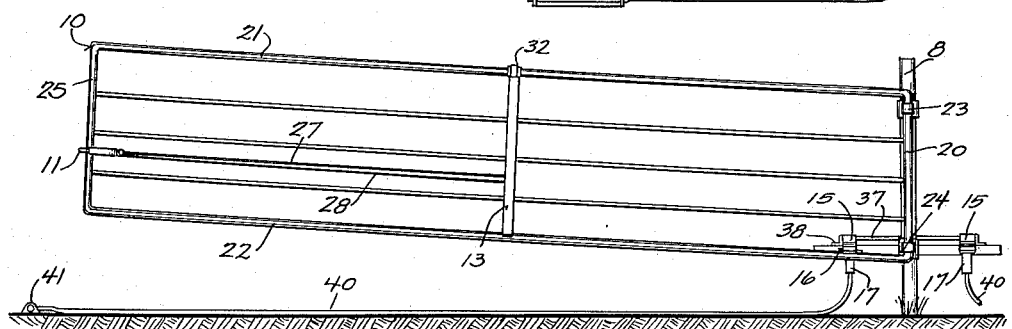
INVENTOR.
CARL J. PIPER
BY
Lieber, Lieber & Nilles
ATTORNEYS May 2, 1961 C. J. PIPER 2,982,036
VEHICLE ACTUATED GATE
Filed Nov. 17, 1958 2 Sheets-Sheet 2
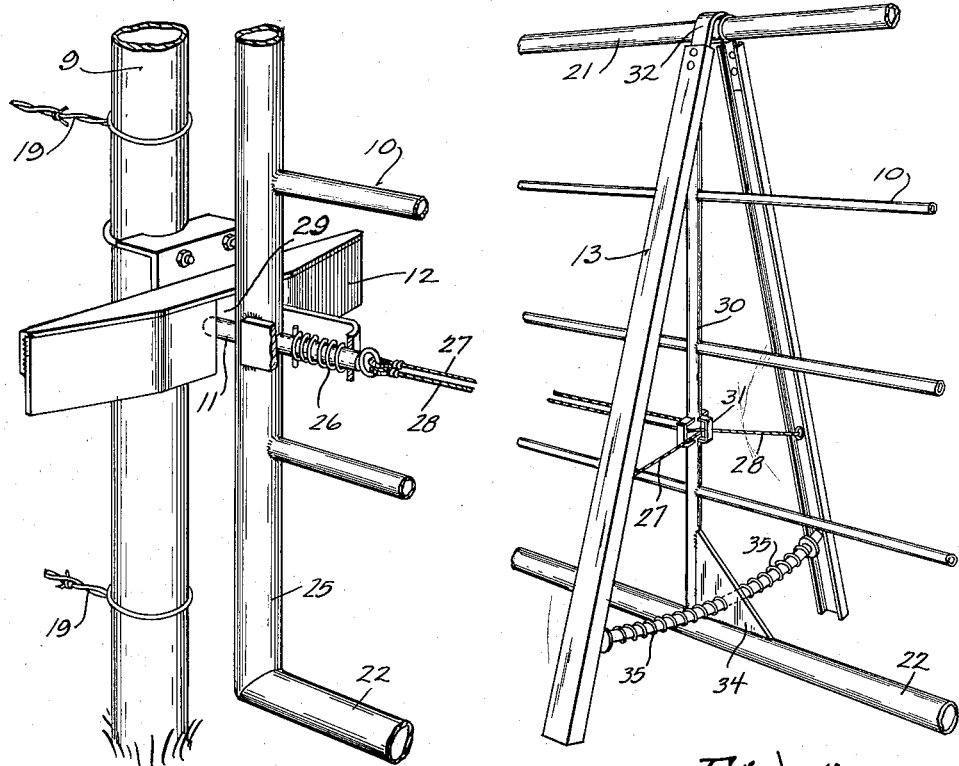
Fig.5
Fig.4
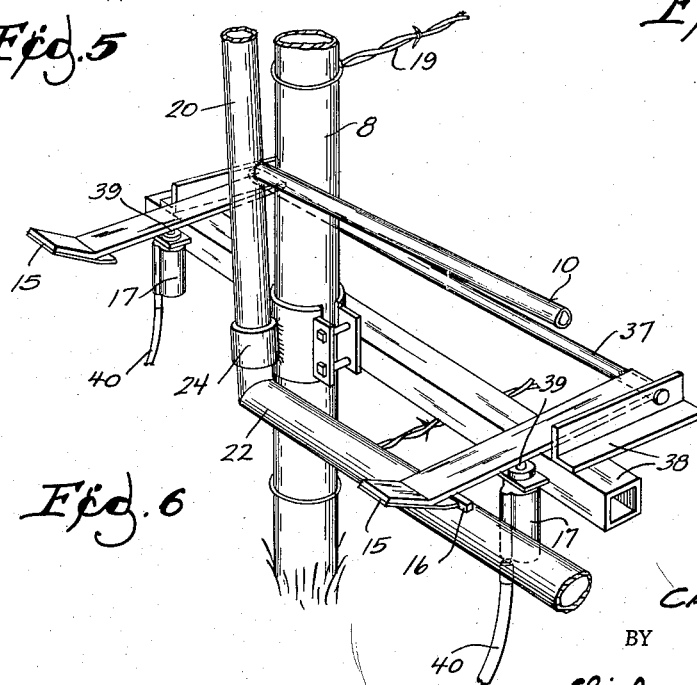
Fig.6
INVENTOR.
CARL J. PIPER
BY
Lieber, Lieber & Nilles
ATTORNEYS United States Patent Office 2,982,036
Patented May 2, 1961

2,982,036

VEHICLE ACTUATED GATE

Carl J. Piper, Rte. 3, Watertown, Wis.

Filed Nov. 17, 1958, Ser. No. 774,245

1 Claim. (Cl. 39—22)

The present invention relates in general to improvements in road traffic controls, and it relates more specifically to improvements in the construction and operation of gate assemblages for gateways leading to and from enclosed areas in which animals such as live-stock are confined.

The primary object of the invention is to provide an improved gate the opening and closing of which may be effectively controlled by a vehicle or similar object traversing the gateway.

On farms or ranches which are provided with fences for confining live-stock within definite areas, it is usually necessary to provide one or more roads or gateways leading into and out of such confining areas, and to also provide efficient gates at the access zones for these areas. Since these roads or gateways are frequently travelled by vehicles such as trucks and automobiles, and in order to avoid necessity of having the driver disembark from the vehicle, it is highly desirable to provide some means for opening and closing these gates with the aid of the advancing vehicle alone. While many different types of assemblages and mechanisms for controlling the opening and closing of doors and gates with aid of approaching vehicles have heretofore been proposed, all of these are not properly adapted for effective use in controlling farm and ranch gates located in the open and which are subjected to varying weather conditions, either because they are too frail and complicated, or because they are too costly to install and to maintain in operating condition.

It is therefore an important object of my invention to provide an improved gate assemblage especially adapted for farm or ranch gateway traffic control, which is rugged but simple in construction, and is also adapted to be effectively actuated by a vehicle or other object traversing the gateway.

Another important object of this invention is to provide an improved vehicle actuated gate which is extremely dependable in action and functions automatically to open and close.

A further important object of the invention is to provide an improved gate especially adapted to confine live-stock within fenced areas such as farms or ranches, and which comprises only a few simple parts capable of functioning most effectively out in the open with minimum attention.

Still another important object of the present invention is to provide an improved gate unit which is operable to open and close by a vehicle or the like traveling along the gateway in either direction, without requiring the driver to leave the vehicle.

An additional important object of this invention is to provide an improved gate structure which is safely operable, and wherein the gate is positively latched and maintained in both closed and open position until the operator desires to release the same.

These and other more specific objects and advantages of the invention will be apparent from the following detailed description.

A clear conception of the several features constituting the present improvement, and of the construction and operation of a vehicle actuated gate assemblage embodying the invention, may be had by referring to the drawings accompanying and forming a part of this specification, wherein like reference characters designate the same or similar parts in the various views.

Figure 1 is a general view looking along the gateway and directly toward the gate in closed position;

Figure 2 is a top view of the entire gate installation, with the gate closed and about to be opened by an approaching vehicle, a fragment of which is shown in dot-and-dash lines;

Figure 3 is another general view looking transversely of the gateway directly toward the open gate;

Figure 4 is an enlarged fragmentary perspective view of the central vehicle actuated gate release and opening mechanism of the unit;

Figure 5 is another enlarged fragmentary perspective view of the swinging end of the closed gate and of the main latch for holding the gate closed; and Figure 6 is still another enlarged fragmentary perspective view of the pivotally suspended end of the open gate and of the auxiliary latch mechanism for holding gate open.

While the invention has been shown and described herein as having been embodied in a farm-yard gate adapted to be opened in opposite directions, it is not intended to confine the improved features to use in such installations, and it is also contemplated that specific descriptive terms employed herein be given the broadest possible interpretation consistent with the actual disclosure.

Referring to the drawings, the improved gate assemblage shown therein, comprises in general, a pair of supports such as posts 8, 9, located on opposite sides of a gateway; a gate 10 having one end pivotally mounted upon the post 8 to swing in either direction across or away from the gateway; a main latch 11 carried by the opposite swinging end of the gate 10 and cooperating with a socket 12 on the post 9 to positively hold the gate closed; a main latch actuator 13 swingably suspended from the medial portion of the gate 10 and being operable by an object such as a vehicle 14 traversing the gateway in either direction to release the main latch 11 and to open the gate 10; a pair of complementary auxiliary latches 15 carried by the post 8 and being alternately cooperable with a lug 16 on the gate 10 to positively hold the latter open in opposite directions; and vehicle actuated hydraulic devices 17 coacting with the auxiliary latches 15 and being operable to release these latches so as to permit the gate 10 to close when the vehicle has advanced a predetermined distance along the gateway.

The upright posts 8, 9 may be formed of durable rod or pipe stock firmly anchored in the ground at the opposite sides of the road or gateway and may also serve for attachment of wire fencing 19 providing an enclosure for a live-stock or farm confining area or the like. The gate 10 may also be durably formed of sections of metal pipe welded together, and is of rectangular shape except for the end member 20 which is slightly inclined relative to the parallel top and bottom rails 21, 22, respectively and is journalled for rotation in off-set upper and lower bearings 23, 24, respectively secured to the upright post 8. This inclination of the pivot member 20 and disposition of the axes of the bearings 23, 24, in a plane perpendicular to the gateway when the gate 10 is closed as in Figures 1 and 2, caused the swinging end of the gate to rise as in Figure 3 when it is swung open in either direction and is maintained open by either of the auxiliary latches 15, but when the holding latch 15 is released, the weight of the elevated swinging gate end automatically causes the gate 10 to swing into closed position by gravity.

The main latch 11 is constantly urged outwardly of the swinging end member 25 of the gate 10 by a spring 26 as shown in Figure 5, and is connected to the ends of two independent cables 27, 28. The socket 12 which is rigidly attached to the post 9 by U-bolts as in Figures 1 and 5, has opposite inclined surfaces for compressing the spring and guiding the latch 11 into the socket recess 29, and the medial portion of the gate 10 is provided with a cylindrical upright rod 30 which is rigidly secured to the top and bottom rails 21, 22, and is provided with three brackets 31 intermediate its ends for guiding the end portions of the cables 27, 28, so as to permit longitudinal sliding thereof in opposite directions about the round rod 30. The inverted V-shaped main latch actuator 13 is formed of rigid channel stock and is swingably suspended from the top rail 21 of the gate 10 by a bearing 32, while the lower end portions of the relatively inclined actuator legs are rigidly united by a single arcuate bar 33 which is slidable through an opening in a plate 34 firmly secured to the lower rail 22 and to the adjacent end of the rod 30 of the gate 10 as shown in Figure 4. Helical compression springs 35 embrace the bar 33 and coact with the opposite sides of the plate 34 so as to constantly urge the actuator 13 toward mid-position, and the ends of the cables 27, 28 beyond the brackets 31 are firmly attached to the legs of the inverted V-shaped actuator 13.

The auxiliary holding latches 15 which are alternately cooperable with the lug 16 secured to the lower gate rail 22 and are alternately cooperable with this lug to maintain the gate 10 open in either direction as in Figure 3, are both swingably secured to a pivot shaft 37 carried by a support 38 firmly bolted to the lower portion of the side post 8 as shown in detail in Figure 6. The two hydraulic devices 17 are alike, and each comprises a cylinder having a piston 39 movable upwardly therein by liquid introduced into the lower end of its cylinder through a tube 40 communicating with a liquid filled flexible receptacle 41 of suitable length. The tubes 40 should be of suitable length so that each of the piston displacing receptacles 41 can be disposed at sufficient distance away from the closed gate and across the road or gateway so as to permit the gate 10 to swing open and shut without interfering with the approaching and leaving vehicle 14 passing through the gate assemblage, and the detailed construction of the receptacles 41 is well known since they have long been available on the open market.

When the improved vehicle actuated gate assemblage has been constructed and installed as above described, its normal operation is as follows: With the gate latched in closed condition as in Figure 1 and Figure 2, a vehicle 14 desiring to pass forwardly through the gateway in the direction indicated by the arrow in Figure 2, should be slowly driven into engagement with the main latch actuator and advanced to first swing this actuator about its suspension bearing 32 sufficiently to release the main latch 11 by exerting a pull on the cable 27, and to thereafter swing the gate 10 freely about its pivot 20 until the lug 16 on the lower rail 22 is engaged by the auxiliary latch 15 located forwardly beyond the gate as in Figure 6. During this opening pivoted movement of the gate 10, its swinging end is elevated as in Figure 3, and the active latch 15 will hold the gate open to permit the more rapidly advancing vehicle to pass, and when the front right wheel of the vehicle 14 contacts the hydraulic receptacle 41 located in its path the corresponding hydraulic device 17 functions to release the active auxiliary latch 15. As soon as this latch 15 is thus released and the vehicle 14 has travelled far enough to clear the gate 10, the latter will automatically swing by gravity from open to closed position and the main latch under the influence of the springs 26, 35 will again engage the socket recess 29.

Such actuation of the gate 10 may obviously be effected by a vehicle 14 or similar body advancing along the gateway in either direction, and while the initial contact of the vehicle with the latch actuator 13 should be rather slow and gentle, the speed of the traversing vehicle may be rapidly increased so as to swing the gate 10 open sufficiently so that its holding lug 16 will be engaged by an auxiliary latch 15. The various latches and bearings of the assemblage should be occasionally lubricated with grease or oil, and the liquid for actuating the hydraulic devices 17 should preferably be of an anti-freeze type, but aside from such care the unit requires no further attention. The various major parts of the mechanism may be readily constructed of available piping, rod stock, and sheet metal to produce gate assemblages of various sizes; and whenever the inverted V-shaped main latch actuator 13 is released the springs 35 quickly restore it to mid-position. The cables 27, 28, should also be adjusted in length so that they will be relatively taut at all times in order to cause the main latch 11 to be released quickly, and the improved gate unit has proven highly satisfactory and successful in actual use.

It should be understood that it is not desired to limit this invention to the exact details of construction and operation herein shown and described, for various modifications within the scope of the appended claim may occur to persons skilled in the art.

I claim:

In combination, a support on each of the opposite sides of a gateway, a gate having one end pivotally suspended from one of said supports while its opposite end is swingable by gravity toward the other support, a bar latch carried by the swinging end of said gate and being horizontally movable and cooperable with said other support to lock the gate closed, an upright rod provided with a cylindrical portion having thereon diametrically opposed guide brackets disposed approximately in the horizontal plane of said latch, said rod being fixedly secured to a medial portion of the gate, a latch actuator having a vehicle contactable rigid arm on each of the opposite sides of and pivotally suspended from said gate and extending downwardly and away from the lower end of said rod, an independent flexible cable directly connecting a medial swinging portion of each of said arms with said latch, the medial portions of said cables extending in opposite directions through said brackets and being longitudinally slidably cooperable directly with the cylindrical portion of said rod to release said latch, and a coil spring coacting with said bar latch to constantly maintain said cables in taut condition.

References Cited in the file of this patent

UNITED STATES PATENTS

| | | |
|---|---|---|
| 1,330,146 | Solberg | Feb. 10, 1920 |
| 1,745,458 | Spangenberg | Feb. 4, 1930 |
| 2,538,470 | Peeples | Jan. 16, 1951 |
| 2,718,079 | Strey | Sept. 20, 1955 |